US012777041B2

(12) United States Patent
Cohen

(10) Patent No.: US 12,777,041 B2
(45) Date of Patent: Oct. 27, 2026

(54) PATH ATTESTATION FOR USE IN AUTHORIZING ACCESS BASED ON THREAT POSTURE

(71) Applicant: VIAVI Solutions Inc., Chandler, AZ (US)

(72) Inventor: Steve Cohen, Chanhassen, MN (US)

(73) Assignee: VIAVI Solutions Inc., Chandler, AZ (US)

( * ) Notice: Subject to any disclaimer, the term of this patent is extended or adjusted under 35 U.S.C. 154(b) by 27 days.

(21) Appl. No.: 18/911,893

(22) Filed: Oct. 10, 2024

(65) Prior Publication Data

US 2025/0141870 A1 May 1, 2025

Related U.S. Application Data

(60) Provisional application No. 63/594,168, filed on Oct. 30, 2023.

(51) Int. Cl.
*G06F 21/00* (2013.01)
*H04L 9/40* (2022.01)

(52) U.S. Cl.
CPC .......... *H04L 63/10* (2013.01); *H04L 63/1425* (2013.01)

(58) Field of Classification Search
None
See application file for complete search history.

(56) References Cited

U.S. PATENT DOCUMENTS

| | | | | |
|---|---|---|---|---|
| 6,952,779 | B1 * | 10/2005 | Cohen | H04L 63/1433 726/22 |
| 8,713,633 | B2 * | 4/2014 | Thomas | H04L 67/10 726/4 |
| 8,990,900 | B2 * | 3/2015 | Edwards | H04L 63/104 726/4 |
| 10,333,930 | B2 * | 6/2019 | Devaney | H04L 63/0876 |
| 12,074,901 | B1 * | 8/2024 | Satish | H04L 63/14 |
| 2005/0193430 | A1 * | 9/2005 | Cohen | H04L 63/1433 726/25 |
| 2008/0263644 | A1 * | 10/2008 | Grinstein | G06F 21/445 726/6 |
| 2015/0381650 | A1 * | 12/2015 | Kaplan | G06F 16/955 726/25 |
| 2021/0194912 | A1 * | 6/2021 | Ward | G06F 21/74 |
| 2022/0366050 | A1 * | 11/2022 | Ben-Noon | H04L 63/1433 |
| 2023/0308277 | A1 * | 9/2023 | Van Cleve | H04L 63/0421 |
| 2024/0314158 | A1 * | 9/2024 | Bourzikas | H04L 63/1441 |
| 2024/0323216 | A1 * | 9/2024 | Gershanov | H04L 63/1433 |
| 2024/0340301 | A1 * | 10/2024 | Thompson | H04L 63/1425 |

* cited by examiner

*Primary Examiner* — Maung T Lwin
(74) *Attorney, Agent, or Firm* — Harrity & Harrity, LLP

(57) ABSTRACT

In some implementations, a device may receive, from a path monitoring subsystem, an indication of a path risk associated with a path to a resource in a computing environment. The device may transmit, to a client device, digital authorization data based on a threat posture associated with an application in the computing environment, wherein the threat posture is based on the path risk associated with the path, and an access request by the client device to access the resource is based on the digital authorization data.

20 Claims, 7 Drawing Sheets

700

PATH ATTESTATION FOR USE IN AUTHORIZING ACCESS BASED ON THREAT POSTURE

CROSS-REFERENCE TO RELATED APPLICATION

This Patent Application claims priority to U.S. Provisional Patent Application No. 63/594,168, filed on Oct. 30, 2023, and entitled "ACCESSING RESOURCES IN A COMPUTING ENVIRONMENT BASED ON PATH ATTESTATION." The disclosure of the prior Application is considered part of and is incorporated by reference into this Patent Application.

BACKGROUND

Network security may involve policies adopted to prevent, detect, and/or monitor unauthorized access or modification of computer network and network-accessible resources. Network security may protect the useability and integrity of an enterprise infrastructure by preventing entry or proliferation within a computer network of a wide variety of potential threats. Network security may involve implementing a firewall to control incoming and outgoing traffic. Network security may involve access control, security policies, application security, data loss protection, network segmentation, network penetration testing, and various other types of protection.

SUMMARY

In some implementations, a method includes receiving, by a path attestation subsystem and from a path monitoring subsystem, an indication of a path risk associated with a path to a resource in a computing environment; and transmitting, by the path attestation subsystem and to a client device, digital authorization data based on a threat posture associated with an application in the computing environment, wherein the threat posture is based on the path risk associated with the path, wherein an access request by the client device to access the resource is based on the digital authorization data, and a path attestation is associated with authorizing access based on the threat posture.

In some implementations, a device includes one or more processors configured to: receive, from a path monitoring subsystem, an indication of a path risk associated with a path to a resource in a computing environment; and transmit, to a client device, digital authorization data based on a threat posture associated with an application in the computing environment, wherein the threat posture is based on the path risk associated with the path, and an access request by the client device to access the resource is based on the digital authorization data.

In some implementations, a non-transitory computer-readable medium storing a set of instructions includes one or more instructions that, when executed by one or more processors of a device, cause the device to: receive, from a path monitoring subsystem, an indication of a path risk associated with a path to a resource in a computing environment; and transmit, to a client device, digital authorization data based on a threat posture associated with an application in the computing environment, wherein the threat posture is based on the path risk associated with the path, and an access request by the client device to access the resource is based on the digital authorization data.

DETAILED DESCRIPTION

The following detailed description of example implementations refers to the accompanying drawings. The same reference numbers in different drawings may identify the same or similar elements.

A security platform may analyze, model, and/or visualize a computing environment (e.g., a cloud computing environment) to proactively assist users in identifying specific resources (e.g., computing instances, data stores, and/or other types of resources) that are vulnerable to attack. The security platform may provide various mechanisms for detecting and controlling infrastructure changes, such as infrastructure as code (IaC), topology discovery, and/or security policy analysis. IaC may involve the provisioning and management of resources. Topology discovery may involve the discovery of resources in the computing environment. Security policy analysis may involve identifying policy rules associated with infrastructure changes, and/or security policy analysis may involve using policy rules to understand allowed communication within the infrastructure. Resources that are vulnerable to attack may be critical resources. The security platform may provide a graphical representation, which may graphically show the resources in the computing environment and connections between the resources. The security platform may include an exposure path management platform, which may provide a list of exposure paths from various points of entry into the computing environment, along with a detailed hop-by-hop reachability to specific assets. The exposure path management platform may enable an identification of unknown or undesired access to assets, and may enable corrective action to be taken. The security platform may include an attack path management platform, which may identify potential attack paths to high-value resources within the computing environment. Attack paths may be based on a combination of exposure, exploitable vulnerabilities, and/or risky configurations. The exploitable vulnerabilities may be based on physical, operating system (OS), application, network, identity/credential, application, and/or other factors, which may provide unintended ways into a protected resource. The exploitable vulnerabilities may involve any system along a path that is able to prove that the system is not running any software that is not allowed to be run. The attack path management platform may provide actionable context, which may allow for proactive and continuous improvement of a security posture. The security platform may include an attack surface management platform, which may provide a detailed inventory of assets, and for each asset, an analysis of an attack surface, an effective exposure, and risk. The analysis may be applied collectively to groupings of assets that form specific applications or workloads. The groupings may be tracked in scorecards and/or visualized in attack surface maps.

Figure 1:
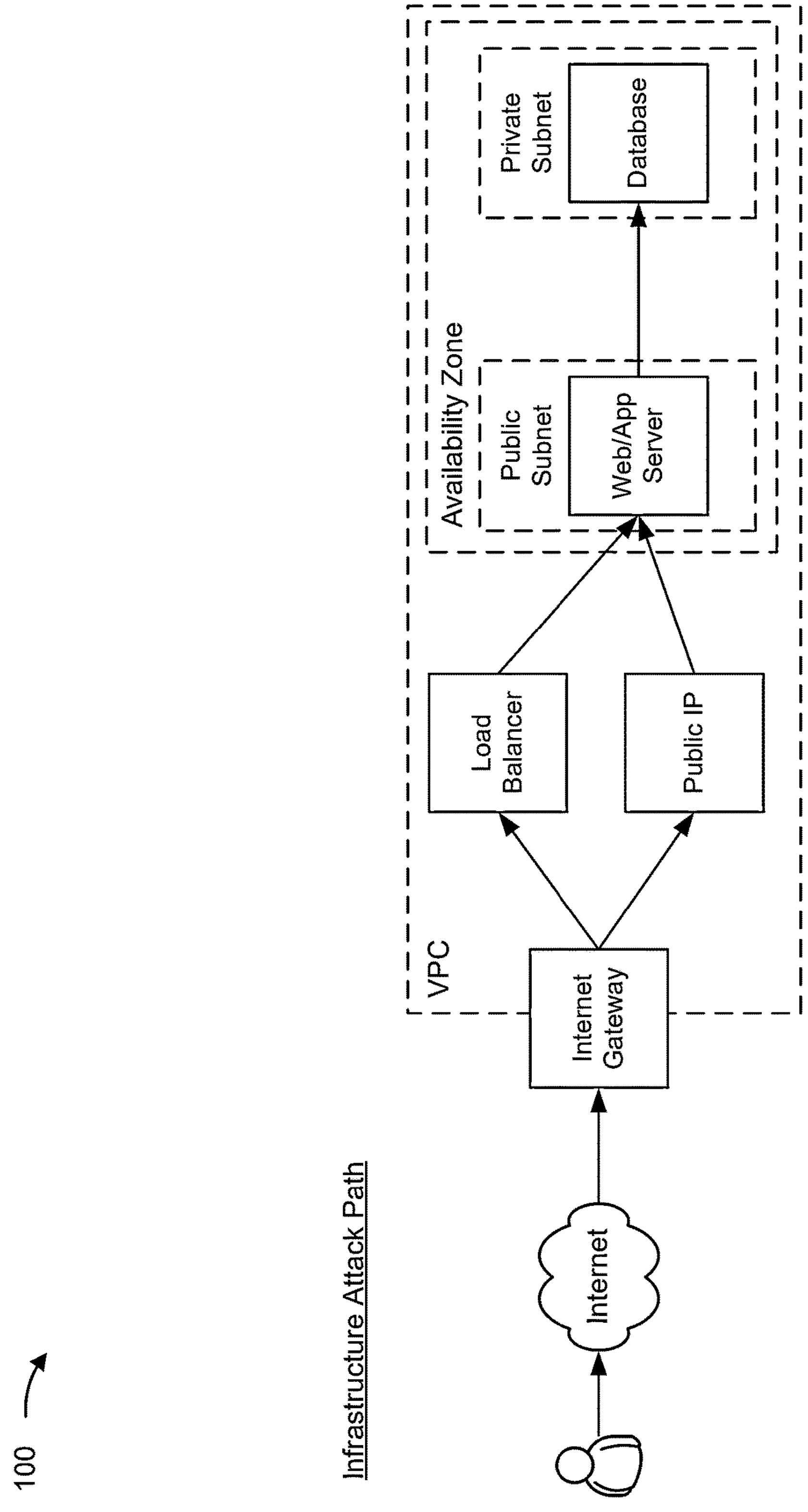
FIG. 1 is a diagram of an example associated with an infrastructure attack path.

FIG. 1 is a diagram of an example 100 associated with an infrastructure attack path.

As shown in FIG. 1, a computing device associated with an attacker may potentially access an Internet gateway via the Internet. The Internet gateway may be associated with a virtual private cloud (VPC). A first path may connect the Internet gateway and a web/application server, either via a load balancer or via a public internet protocol (IP) address. The web/application server may be associated with a computing instance. The web/application server may be associated with a public subnet, where the public subnet may be associated with an availability zone. A second path may connect the web/application server and a database. The database may be a resource (e.g., a critical resource). The database may be associated with a private subnet, where the private subnet may be associated with the availability zone. A security platform, using an attack path management platform, may identify potential attack paths the attacker may exploit to access the database (e.g., a path via the load balancer or a path via the public IP address). Depending on the potential attack paths that are identified, corrective action may be taken to better secure the database from attack. For example, attack paths that are most likely to be taken may be identified, and the correction actions (e.g., closing ports or applying security patches) may be taken for those attack paths. Further, the security platform may scan different elements in a system (e.g., the load balancer and the web/application server) and determine whether certain elements are associated with security vulnerabilities.

As indicated above, FIG. 1 is provided as an example. Other examples may differ from what is described with regard to FIG. 1.

A zero trust framework may include a policy engine, a policy administrator, and a policy enforcement point. The zero trust framework may include continuous diagnostics and mitigation (CDM), industry compliance, threat intelligence, activity logs, data access policies, public key infrastructure (PKI), identifier (ID) management, and/or security information and event management (SIEM).

Zero trust network access (ZTNA) and other similar technologies may provide solutions (e.g., access control, trusted execution, endpoint trust, and/or firewall policies) for securing resources within an enterprise or other organization. However, ZTNA and other similar technologies may overly complicate an application deployment process, and may not reliably control for insider threats and credential theft. Further, ZTNA and other similar technologies may not prevent hackers from gaining access to resources. For example, ZTNA and other similar technologies may not prevent attackers from exploiting network paths that were not intended to allow reachability to the resources. As a result, a level of security provided by ZTNA and other similar technologies may be lacking, and thus may degrade an overall security of a computing environment.

In some implementations, a client device may transmit, to a path monitoring subsystem, a request for path approval for a path to a resource (e.g., a critical resource) in a computing environment. The client device may transmit, to a path attestation subsystem, a request for an attestation token. The client device may receive, from the path attestation subsystem, the attestation token based on a threat posture associated with the application. The threat posture is based on a path risk associated with the path. The path monitoring subsystem may determine the path risk based on the request for the path assessment and path preapproval, and the path monitoring subsystem may indicate the path risk to the path attestation subsystem. The path attestation subsystem may use the path risk when determining whether to provide the attestation token to the client device. The client device may transmit, to a trust broker, an access request to access the resource. The access request may indicate the attestation token. In some cases, the client device may receive, from the trust broker, an indication that the access request is granted. The client device may access the resource, which may or may not be based on the indication.

In some implementations, the threat posture of the application may be determined based on the application's potentially exploitable network paths, in addition to other factors. An assessment of the threat posture of the application may be used as a basis for granting or denying access to the resource. In other words, the application may be granted access to the resource, or the application may be denied access to the resource, based on the threat posture of the application. In some implementations, a human user instead of an application may need access to a resource, such as a high-value asset (HVA). In this case, access to the resource may be allowed or denied based on risk factors unique to an access pattern, such as whether the user is logged in via a jump box, or at least provably on a local area network (LAN) or a virtual private network (VPN).

In some implementations, attack surface and attack path scanning may be leveraged to provide security operations with an ability to ensure that an application deployment is authorized to access the resource when needed, and that the application deployment is unlikely to be compromised or accessed in an unintended manner. An application that attempts to gain access to the resource may need to have its threat posture validated. During a threat posture validation, the application may be required to not deviate from its current state. The threat posture validation may be evaluated (e.g., autonomously or manually) for its risk level on an absolute scale and/or relative to previous deployments of the application. When the risk level is acceptable, the attestation token or other cryptographic proof may be provided, which may allow the application to gain access to the resource for a designated period of time, and/or until a designated condition is met (e.g., an amount of time). Such a process may repeat until the application no longer needs access to the resource (e.g., which may be for the lifetime of the application). When the application attempts to gain access to the resource after an application update, and such an attempt introduces an unexpected exploitable path, the application may be automatically denied access to the resource, assuming that the threat posture validation of the application does not accept the unexpected exploitable path.

In some implementations, network paths of potential communication may be used as a first-class input to policy enforcement. A network path attestation may attempt to guarantee that any change to potential network paths are detected immediately and reevaluated for risk, before granting continued access to the resource. Since closing all potential network paths may be unfeasible, a network path risk assessment may be used to help prioritize additional zero-trust measures and to track network path risk over time. Each entity along a potential network path may carry its own level of "risk of compromise" and "exploitability once compromised," so an attestation process may be transitive in nature and may require a certain level of additional assurance from each entity. The additional assurance may involve protection by a zero-trust policy, non-use of certain exploitable technologies, hardware-validated trusted execution state, free of suspicious activities based on an entity behavior analysis, and so on.

In some implementations, by granting or denying access to the resource based on the threat posture of the application, which may depend on potentially exploitable network paths associated with the application, an attacker may be prevented from gaining remote access to the resource. Such an approach may be based on attack surface and attack path discovery, attack path vulnerability scanning, attack path risk assessment, trusted execution attestation, and/or access controls based on a zero trust model. An insider may be less likely to gain access to the resource due to the careful scrutiny of network paths that would allow the access. A legacy application that offers an unintended access path to the resource may be baselined, with enforcement exceptions approved as needed, and stakeholders may have visibility to a current threat posture of the legacy application. Further, the stakeholders may be provided with insights for improving the application's threat posture in order to successfully access the resource.

In some implementations, existing attack path management technologies may scan and inform users about vulnerabilities in a computing environment, but such technologies may not directly make access to resources contingent upon the threat posture meeting specific prerequisites. By directly making access to resources contingent upon the threat posture meeting specific prerequisites, an overall security level of the application may be improved.

Figure 2:
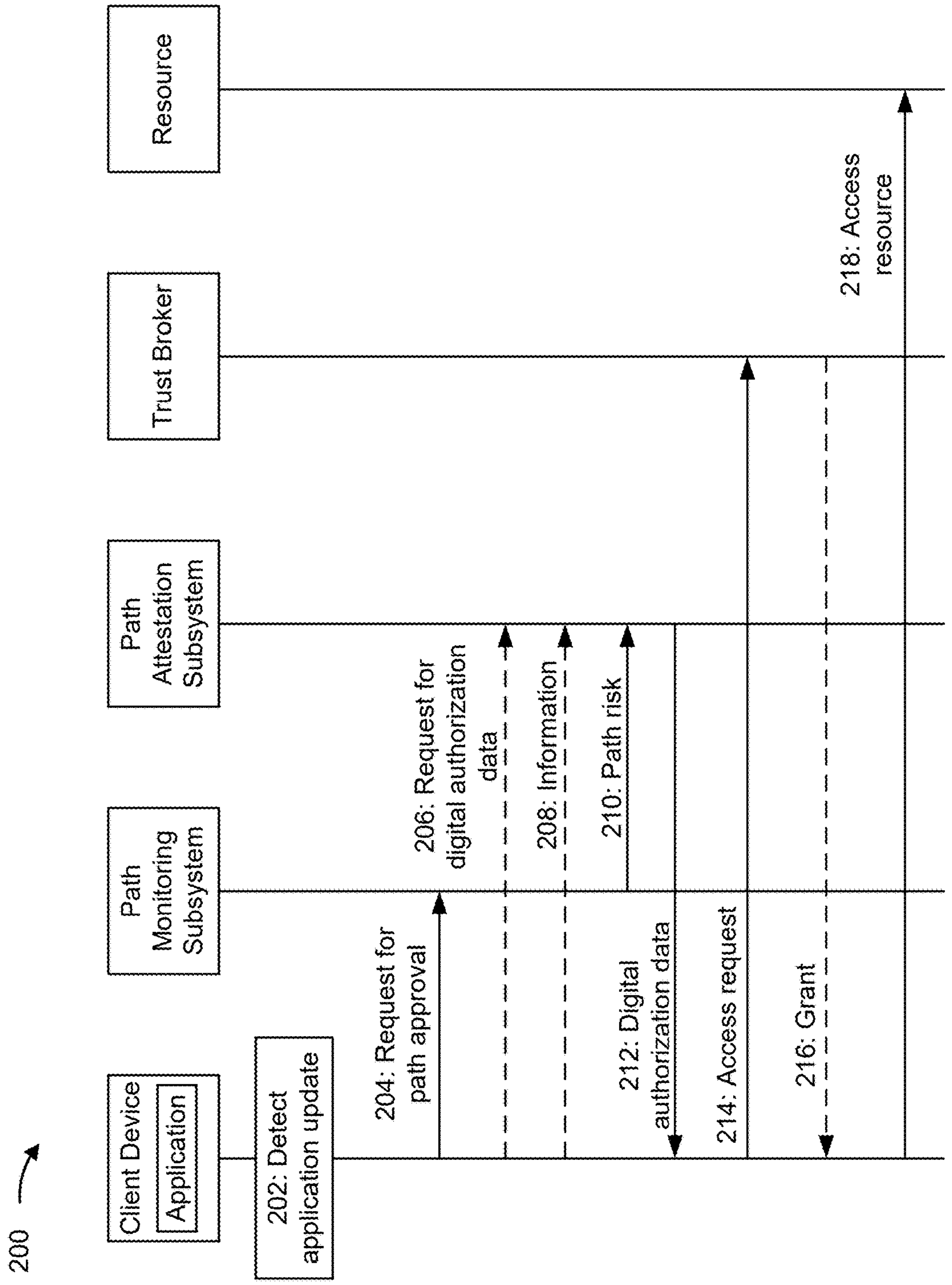
FIGS. 2-4 are diagrams of example implementations associated with accessing resources in a computing environment based on path attestation.

FIG. 2 is a diagram of an example implementation 200 associated with accessing resources in a computing environment based on path attestation. As shown in FIG. 2, example implementation 200 includes a client device that executes an application, a path monitoring subsystem, a path attestation subsystem, a trust broker, and a resource (e.g., a critical resource) in a computing environment. These devices are described in more detail below in connection with FIG. 5 and FIG. 6.

In some implementations, the access of resources using path attestation may be associated with the computing environment, such as a cloud computing environment. In some implementations, the access of resources using path attestation may be intended to be used in traditional applications. In some implementations, a network may not be involved when the trust broker is available to mediate access to a designated resource, and mechanisms are defined to identify a set of paths, identify changes along the paths, assess planned changes, and/or securely attest to a current state.

In some implementations, the path monitoring subsystem, the path attestation subsystem, and/or the trust broker may be separate functions. The path monitoring subsystem, the path attestation subsystem, and/or the trust broker may be associated with a same computing device. Alternatively, the path monitoring subsystem, the path attestation subsystem, and/or the trust broker may be associated with different computing devices.

In some implementations, the trust broker may be deployed in front of the resource. The trust broker may be responsible for allowing access or denying access to the resource. The trust broker may be an access mediator or zero-trust policy enforcement point. The trust broker may securely load a policy for allowing or denying access to the resource.

In some implementations, the resource may be associated with sensitive business assets (e.g., crown jewels). The resource may be associated with customer data, patient data, human resources data, or personally identifiable information (PII) data. The resource may be associated with source code or builds, cryptographic keys, password stores, policies, controls, backup, availability of electronic pages (e.g., websites) or services, and/or path attestation services. As an example, regarding the availability of electronic pages or services, an electronic commerce website may be run by a company that loses money, customers, and/or reputation whenever the website is unavailable. Even though the website may be internet exposed, the website may be preceded by anti-distributed denial-of-service (DDoS) technology. Thus, a path bypassing the anti-DDoS technology may be a path for an attacker to cause financial loss for the company.

In some implementations, the resource may be an asset that is protected for purposes of confidentiality, integrity, and/or availability. The resource may be a database that stores customer data, patient data, human resources data, source code, cryptographic keys, passwords, policies, control information, backup information, information regarding an availability of an electronic page or a service, and/or a path attestation service. The resource may be a database, a file store, a repository, and/or an object store. The resource may be a network-accessible service for which high availability is required. The resource may be a network-accessible service for which access control is required. The resource may be a security service including a path attestation service. The resource may be a control system. The resource may be a secure subnetwork. The resource may be a thread, a process, a container, a pod, a cluster, and/or an application whose access was intended to be restricted.

As shown by reference number 202, the client device may detect that the application has been updated (or that a segment of the application has been updated). For example, the client device may detect that the application has been updated from a first version to a second version. One or more components of the application may be modified based on the application update. The application, prior to the update, may be preapproved to access the resource using a previous path to the resource. The previous path may traverse a certain combination of elements in a network, such as an Internet gateway, a load balancer, and/or a web/application server. When the application is updated, the client device may determine that the previous path is no longer valid. In other words, the preapproval associated with the previous path may no longer be valid after the application update. A previous path assessment and/or a previous path preapproval may no longer be valid based on the application update.

In some implementations, a subsystem other than the client device may detect that the application has been updated. For example, every subsystem in the computing environment may check whether the application has been updated or whether an access pattern has changed. When the client device indicates that the application has not changed, but the application really did change, another subsystem may be able to indicate that the application has changed. In this case, a token associated with the application should cease to be valid, or may cease to be valid after a time limit has expired. In some implementations, the client device may detect the change to the application and/or may run the application. In some cases, the application may be associated with a widely distributed microservices architecture, which may include a plurality of client devices, containers, virtual machines (VMs), processes, functions, etc. The widely distributed microservices architecture may collectively be referred to as the application, and when any part of the widely distributed microservices architecture is updated, the application is considered to have been updated. While the client device may detect and respond to updates, a rest of an attestation system may generally expect proof that the application has not updated since the token has been granted.

As shown by reference number 204, the client device may transmit, to the path monitoring subsystem, a request for path approval for a path to the resource. For example, the request may be for a path assessment and/or a path preapproval for the path, which may be between the client device and the resource. The path may be the same as the previous path, or the path may be a different than the previous path. The path may be an intended path to be used by the client device to access the resource. The client device may transmit the request for path approval based on the application update. In some implementations, the path preapproval may be an approval before the application update and/or after the application update. In some cases, the path assessment may be required prior to every access.

In some implementations, after the application update, the client device may need to access the resource. For example, the client device may need to access data stored on the resource. However, due to the application update, the client device may no longer be able to immediately access the resource. Rather, after the application update, the client device may need to reprove that the client device is a trusted device and should be able to access the resource. The client device may transmit the request for path approval based on the application update in order to be able to access the resource.

As shown by reference number 206, the client device may transmit, to the path attestation subsystem, a request for digital authorization data. The digital authorization data may include an attestation token, a password, a strong credential, a digital signature, or other cryptographic proof, which may allow the client device to access the resource. In other words, the client device may need to possess the digital authorization data in order to be granted access to the resource, and the path attestation subsystem may be responsible for granting the digital authorization data. The digital authorization data may be associated with any mechanism to authorize or process access is allowed. The request may be for the digital authorization data, which may be used for secure attestation, and/or the request may be for proof of authorization. The client device may transmit the request for the digital authorization data based on the application update. In some cases, when the application is segmented, multiple valid attestation tokens may be required for each segment, which may minimize an impact of the application update.

As shown by reference number 208, the client device may transmit, to the path attestation subsystem, information associated with a threat posture of the application. The information may include a credential score, which may assess a reliability of credentials provided by the client device. The information may include an identity score, which may assess an authenticity of an identity associated with the client device. The identity score may be related to a risk associated with the identity/credential. The identity score may indicate whether the identity is a high privilege identity, such as a chief executive officer (CEO). The identity score may indicate whether the identity is associated with a high value target, an easily manipulated user, and/or a country associated with user with that identity. The information may include a trusted execution status, which may indicate whether the client device is able to implement a trusted execution environment (e.g., a protected area on hardware in which code is able to be run securely and in isolation). The trusted execution status may indicate whether the application is verifiably running in a secure state (as backed by hardware and other policies). The information may include a device health attestation, which may indicate a health of the client device (e.g., device performance metrics, battery metrics, software running on the client device, and other health-related information). The information may include a device posture score, which may indicate whether the application is policy compliant, has anti-virus capabilities, and/or runs on public WiFi. The information may include a device intrusion score, which may indicate whether the client device is associated with malicious activity or policy violations. Such information provided by the client device may indicate the threat posture of the client device and/or the application running on the client device. In other words, the information may indicate whether the client device is likely to pose a security threat. In some cases, different scores may be merged into an aggregate score, which may indicate the threat posture associated with the client device and/or the application. In some implementations, the client device may not necessarily transmit the information, and instead the information may be received from an external attestation system. For example, a VPN client may run a posture assessment of its own, and a VPN controller may attest to the posture of a connected device.

As shown by reference number 210, the path monitoring subsystem may transmit, to the path attestation subsystem, an indication of a path risk associated with the path. The path risk may be associated with the path to the resource in the computing environment. The path risk (or path risk score) may account for security vulnerabilities associated with the path. The path risk may be based on a path configuration that increases or decreases a likelihood that the path may be used for security threats. The path risk may be based on whether the path has been preapproved in the past for use by the client device to access the resource. The path risk may be based on whether the path has not been previously used by the client device to access the resource. The path risk may be based on whether the path introduces an unexpected exploitable path. The path risk may be based on a business criticality associated with the application. The path risk may depend on security measures associated with entities along the path. For example, when entities along the path are associated with a zero-trust policy, a non-usage of certain exploitable technologies, a hardware-validated trusted execution state, non-suspicious activities based on entity behavior analysis, compliance with password-less authentication, and/or password vault solutions, the path risk may be decreased. The path risk may be associated with the threat posture of the application.

As shown by reference number 212, the path attestation subsystem may transmit, to the client device, the digital authorization data (e.g., the attestation token). The path attestation subsystem may transmit the digital authorization data in response to the request by the client device. The digital authorization data may be based on the threat posture associated with the application in the computing environment, where the threat posture may be based on the path risk associated with the path. The path attestation subsystem may determine to issue the digital authorization data based on the threat posture associated with the application. The path attestation subsystem may determine the threat posture based on the path risk, the credential score, the identity score, the trusted execution status, the device health attestation, and/or the device intrusion score. In other words, based on such information, the path attestation subsystem may determine that the client device poses no security risk or minimal security risk when accessing the resource, so the path attestation subsystem may transmit the digital authorization data, which may enable the client device to access the resource. By issuing the digital authorization data, the path attestation subsystem may indicate that the path has been verified to not pose the security risk.

In some implementations, the client device may receive the digital authorization data when the path is the previous path used by the application to access the resource. The client device may receive the digital authorization data when the path is an expected non-exploitable path, which may not pose the security risk when accessing the resource. In some implementations, the path attestation subsystem, when determining the threat posture, may determine a threat posture score. The threat posture score may indicate a likelihood that the client device is a security risk when accessing the resource. The path attestation subsystem may compare the threat posture score to a threshold, and when the threat posture score satisfies the threshold, the path attestation subsystem may issue the digital authorization data. Alternatively, or additionally, the path attestation subsystem may compare the threat posture to a previous deployment of the application. When the threat posture is the same or less than the previous deployment of the application (e.g., the same level of security risk or a lower level of security risk), the path attestation subsystem may issue the digital authorization data. When the threat posture is greater than the previous deployment of the application (e.g., the higher level of security risk), the path attestation subsystem may determine to not issue the digital authorization data.

In some implementations, when issuing digital authorization data, the path attestation subsystem may also transmit a validation key (e.g., a token validation key) to the trust broker. The validation key may indicate to the trust broker that the path attestation subsystem actually issued the digital authorization data to the client device.

In some implementations, with digital authorization data, any strong verification in which the client device possesses a valid token may be employed. For example, the client device may provide a password obtained using the valid token, or another token/session obtained using the valid token, or the client device may provide an ability to prove via a challenge response.

As shown by reference number 214, the client device may transmit, to the trust broker, an access request to access the resource. The access request may indicate the digital authorization data, which may have been previously received by the path attestation subsystem. The trust broker may verify the digital authorization data based on the validation key received from the path attestation subsystem. The trust broker, based on the access request, the digital authorization data, and the validation key, may determine to grant the access request. In other words, the trust broker may determine to approve the access request. In some implementations, the access request may indicate a suitable substitute for the digital authorization data. In this case, the access request may prove authorization, even when the authorization proof itself is not indicated in the access request.

In some implementations, the path may be a path of potential communication, and a presence of the digital authorization data based on the path may be an input, of a plurality of inputs, to the trust broker for determining whether to grant access to the resource. In other words, the trust broker may not only consider the presence of the digital authorization data when determining whether to grant access to the resource. The trust broker may consider other factors, such as CDM, industry compliance, threat intelligence, activity logs, data access policies, PKI, ID management, and/or SIEM, when determining whether to grant the client device with access to the resource. In some implementations, a path attestation may be associated with a threat posture risk assessment for a zero trust access control. The path attestation may be associated with authorizing access based on the threat posture. The path attestation may ensure that a change to a potential path exposure is detected and reevaluated for security risk before access to the resource is granted. The path attestation may provide verification that paths and application component versions are the same as when the digital authorization data was originally issued.

As shown by reference number 216, the client device may receive, from the trust broker, an indication that the access request is granted. The indication may indicate that the client device is allowed to access the resource for a certain period of time. In one example, the indication that the access request is granted may be an optional indication, as access to the resource may be sufficient evidence that access has been granted.

As shown by reference number 218, the client device may access the resource, which may or may not be based on the indication received from the trust broker. For example, the client device may retrieve data stored on the resource. The data may be consumed by the application running on the client device. After the certain period of time, access to the resource may time out. At a later time, when the application is updated (e.g., an existing application component is modified or a new application component is added), the process may be repeated.

In some implementations, the path attestation subsystem may not transmit the digital authorization data to the client device. The path attestation subsystem may determine to not issue the digital authorization data based on the threat posture associated with the application. The path attestation subsystem may determine the threat posture based on the path risk, the credential score, the identity score, the trusted execution status, the device health attestation, and/or the device intrusion score. In other words, based on such information, the path attestation subsystem may determine that the client device poses a security risk when accessing the resource, so the path attestation subsystem may not transmit the digital authorization data, which may prevent the client device from accessing the resource. As a result, the client device may not transmit the access request to the trust broker. Alternatively, the client device may transmit the access request but without the digital authorization data, which may cause the trust broker to deny the request without the digital authorization data or using a previous attestation token.

In some implementations, the resource may be any resource (e.g., including a physical resource) to be protected from read operations, modify operations, write operations, delete operations, copy/move operations, execute operations, operations associated with changing permissions, operations associated with interruption of availability, operations associated with controlling a physical barrier, operations associated with influencing the integrity of a digital or physical barrier, and/or other operations worthy of protection. The resource, when associated with data storage, may include a database, data lake, data warehouse, file storage, object storage, metadata storage, and/or code/object repository. The resource, when associated with security management components, may be associated with key/credential storage/management, security information and event management (SIEM), security orchestration, automation and response (SOAR), extended detection and response (XDR), policy management, a secure zone within a network, a network sniffer, endpoint management, and/or attack management/mitigation systems. The resource, when associated with network/application administration, may include a domain controller, an email service, and/or a VPN controller. The resource, when associated with physical security, may be associated with opening a gate, controlling a stoplight, opening a window or window treatment, controlling a vehicle, aircraft, or satellite, and/or deploying a weapon.

In some implementations, a system monitoring may be performed for triggering an update to a path approval. For example, based on the system monitoring, periodic reapproval, application updates, infrastructure updates, and/or physical system changes may be implemented. Paths to the resource may be automatically reapproved after a certain duration of time or based on a condition being satisfied. In some implementations, as part of the path approval, a path risk associated with the path may be analyzed. The path risk may be associated with a current or a desired future state of the application or an infrastructure used by the application. The path approval may be used to access the resource by providing authorization information to some mediation point, such as the trust broker.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
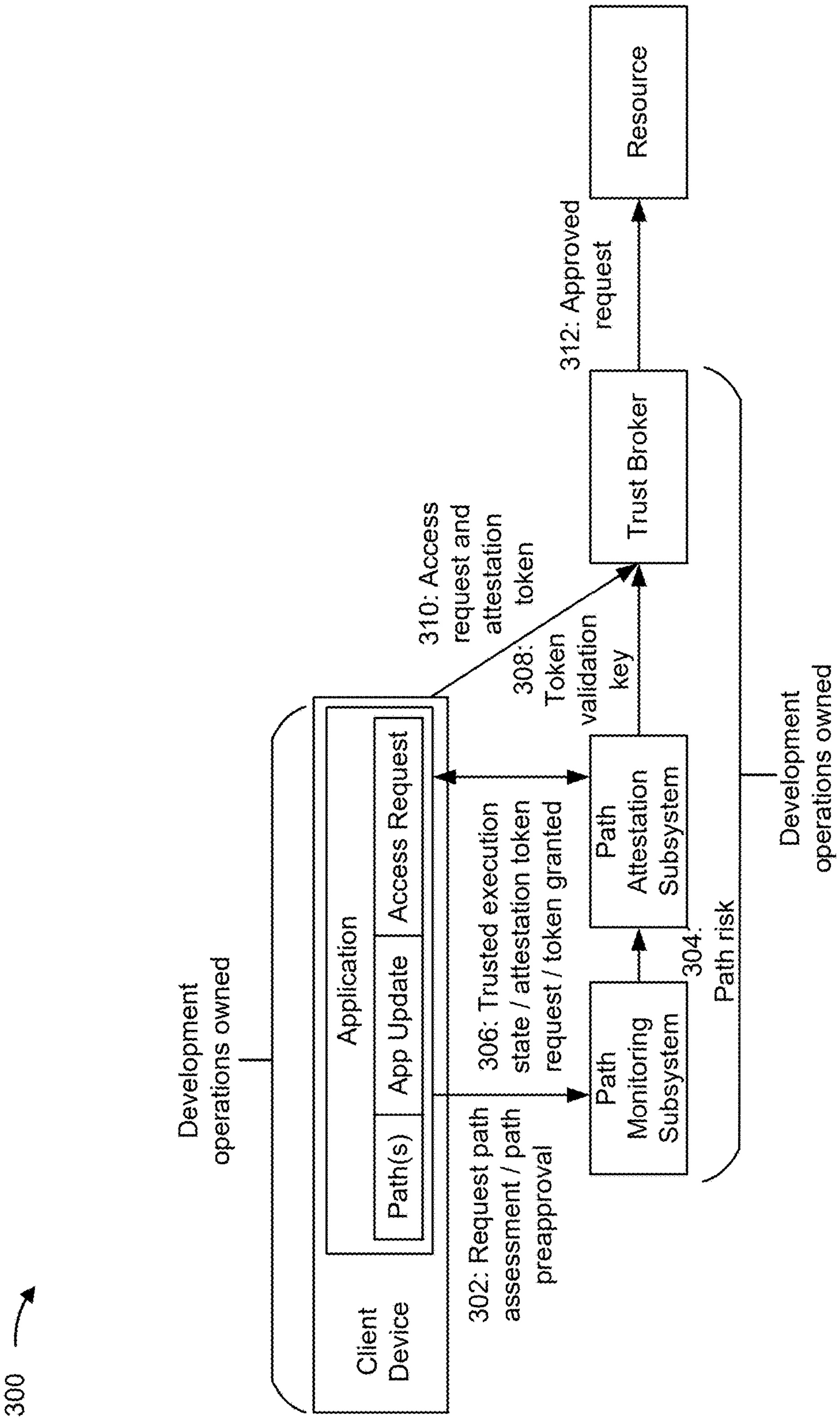

FIG. 3 is a diagram of an example implementation 300 associated with accessing resources in a computing environment based on path attestation. As shown in FIG. 3, example implementation 300 includes a client device that runs an application, a path monitoring subsystem, a path attestation subsystem, a trust broker, and a resource (e.g., a critical resource) in a computing environment. These devices are described in more detail below in connection with FIG. 5 and FIG. 6.

In some implementations, the path monitoring subsystem, the path attestation subsystem, and/or the trust broker may be separate functions. The path monitoring subsystem, the path attestation subsystem, and/or the trust broker may be associated with a same computing device. Alternatively, the path monitoring subsystem, the path attestation subsystem, and/or the trust broker may be associated with different computing devices.

In a path attestation system, the application that runs on the client device may attempt to access the resource. The resource may be associated with sensitive business assets (e.g., crown jewels). The resource may be associated with customer data, patient data, human resources data, or PII data. The resource may be associated with source code or builds, cryptographic keys, password stores, policies, controls, backup, availability of electronic pages (e.g., websites) or services, and/or path attestation services. The application may attempt to access the resource via a path. The path may be one of multiple paths between the application and the resource. The application may attempt to access the resource when a component of the application is updated. In order for the application to successfully access the resource, a collective state of the application, and all of the application components, may need to be the same or sufficiently the same, as when the application was previously approved to access the resource.

As shown by reference number 302, the application may request a path risk assessment and/or a path preapproval from the path monitoring subsystem. The path monitoring subsystem may determine a path risk associated with the application. The path risk may be associated with the path risk assessment. The path risk may indicate a security risk associated with the path intended to be used by the application to access the resource. The path risk may depend on whether the path has already been preapproved. The path risk may depend on whether the path is a new insecure path which has not been previously approved. The new insecure path may be an unexpected exploitable path (or potentially exploitable path) introduced by the application. The path risk may be associated with a threat posture of the application. The path risk may be based on a scorecard, which may indicate the path risk assessment associated with the application. The path risk may depend on a business criticality, vulnerabilities, coverage, compliance, exposure risk, and various other factors. In some cases, when the path is the new insecure path which has not been previously approved, the scorecard may indicate a failing score, where the failing score may indicate that the threat posture is beyond an acceptable amount.

As shown by reference number 304, the path monitoring subsystem may provide an indication of the path risk to the path attestation subsystem. As shown by reference number 306, the application may provide, to the path attestation subsystem, a trusted execution state and an attestation token request. The trusted execution state may indicate a trusted execution status associated with the application. The application may provide, to the path attestation subsystem, a credential score, a device health attestation, and/or a device intrusion score. The path attestation subsystem, based on the path risk, the attestation token request, and other inputs received from the application, may grant the attestation token. The path attestation subsystem may provide the attestation token to the application. By providing the attestation token, the path attestation subsystem may determine that the path risk associated with the path used by the application to access the resource satisfies a threshold. In other words, the application may have successfully proved that access to the resource should be granted. As shown by reference number 308, the path attestation subsystem may provide a token validation key to the trust broker, where the token validation key may indicate to the trust broker that the path attestation subsystem provided the attestation token to the application. The trust broker may be deployed in front of the resource. The trust broker may be an access mediator or zero-trust policy enforcement point. The trust broker may securely load a policy for allowing access to the resource.

As shown by reference number 310, the application may transmit an access request to the trust broker. The access request may be to access the resource. The application may transmit the attestation token along with the access request. The trust broker may receive the access request and the attestation token. As shown by reference number 312, the trust broker may determine to approve the access request, and the application may subsequently be permitted to access the resource. In some implementations, as long as a current version of the application does not change, and the application does not attempt to access the resource using a new insecure path, the application may continue to be permitted to access the resource. When the current version of the application does not change, this process may be repeated to ensure that the application is not attempting to access the resource using the new insecure path. The trust broker may determine to allow the application to access the resource based on the policy loaded onto the trust broker.

In some implementations, the path monitoring subsystem may provide the indication of the path risk to the path attestation subsystem. The application may provide, to the path attestation subsystem, the trusted execution state and the attestation token request. The application may provide, to the path attestation subsystem, the credential score, the device health attestation, and/or the device intrusion score. The path attestation subsystem, based on the path risk, the attestation token request, and other inputs received from the application, may determine to not grant the attestation token. The path attestation subsystem may not provide the attestation token to the application. In some cases, the path attestation subsystem may provide, to the application, an indication that the attestation token has been denied. In this case, the application may be unable to transmit the access request to the trust broker, and thus, the application may be unable to access the resource.

In some implementations, access control to security data may be enforced by a security team. In order to gain access to the resource, the application (or user) may need to prove that a certain degree of validation has been met by having a set of threat analysis tools attest to the assurance behind the access. A higher sensitivity associated with the access may be associated with a higher degree of validation needed. Each access attempt may be required to supply a digitally signed proof of threat posture (e.g., the attestation token), which may be based on the path risk (or path score), a credential/identity score, the trusted execution status, the device health attestation, and/or the device intrusion score. In some cases, the digitally signed proof of threat posture may be issued based on a single scorecard, which may incorporate the path risk, the credential/identity score, the trusted execution status, the device health attestation, and/or the device intrusion score.

In some implementations, instead of the attestation token, the application may provide, along with the access request, a password to the trust broker. The password may be a frequently-rotated password via a secured store, which may constitute proof by transitivity. The password may indicate to the trust broker that the path risk associated with the path used by the application to access the resource satisfies the threshold, and the trust broker may grant the application access to the resource based on a receipt of the password. In some implementations, the access request may be further vetted for having originated from a trusted application or context. The trust broker may verify that the application that is requesting the access to the resource is indeed a trusted application. After successful validation that the proof is both adequate and trusted, the trust broker may grant access to the resource. Otherwise, the trust broker may deny access to the resource.

In some implementations, tools may be provided for deploying staging to ensure denial will not occur for properly deployed applications (e.g., path preapproval). For example, when the application has already been approved to use a certain path, subsequent requests to access the resource using the same preapproved path may be granted. In some implementations, owners of resources (or critical assets) may view threat posture at any time, including which applications required exceptions, such that the threat posture may be hardened over time. In some implementations, line of business owners may view score drifts over time and recommended next steps, which may ensure that the threat posture is aligned with a business risk appetite. Further, such an approach may be enhanced to prevent denial of service (DOS) issues, and may have the possibility of restoring access when keys are lost.

In some implementations, the application may attempt to access the resource, and such attempt may be controlled by the trust broker. The trust broker may receive various inputs, such as the attestation token, the path score, the credential score, the trusted execution status, the device health attestation, and/or the device intrusion score. The trust broker may employ a trust algorithm, policy decision making, and policy enforcement. The trust broker, based on the various inputs, and the trust algorithm, the policy decision making, and the policy enforcement, may determine whether access to the resource should be allowed or denied.

As indicated above, FIG. 3 is provided as an example. Other examples may differ from what is described with regard to FIG. 3.

Figure 4:
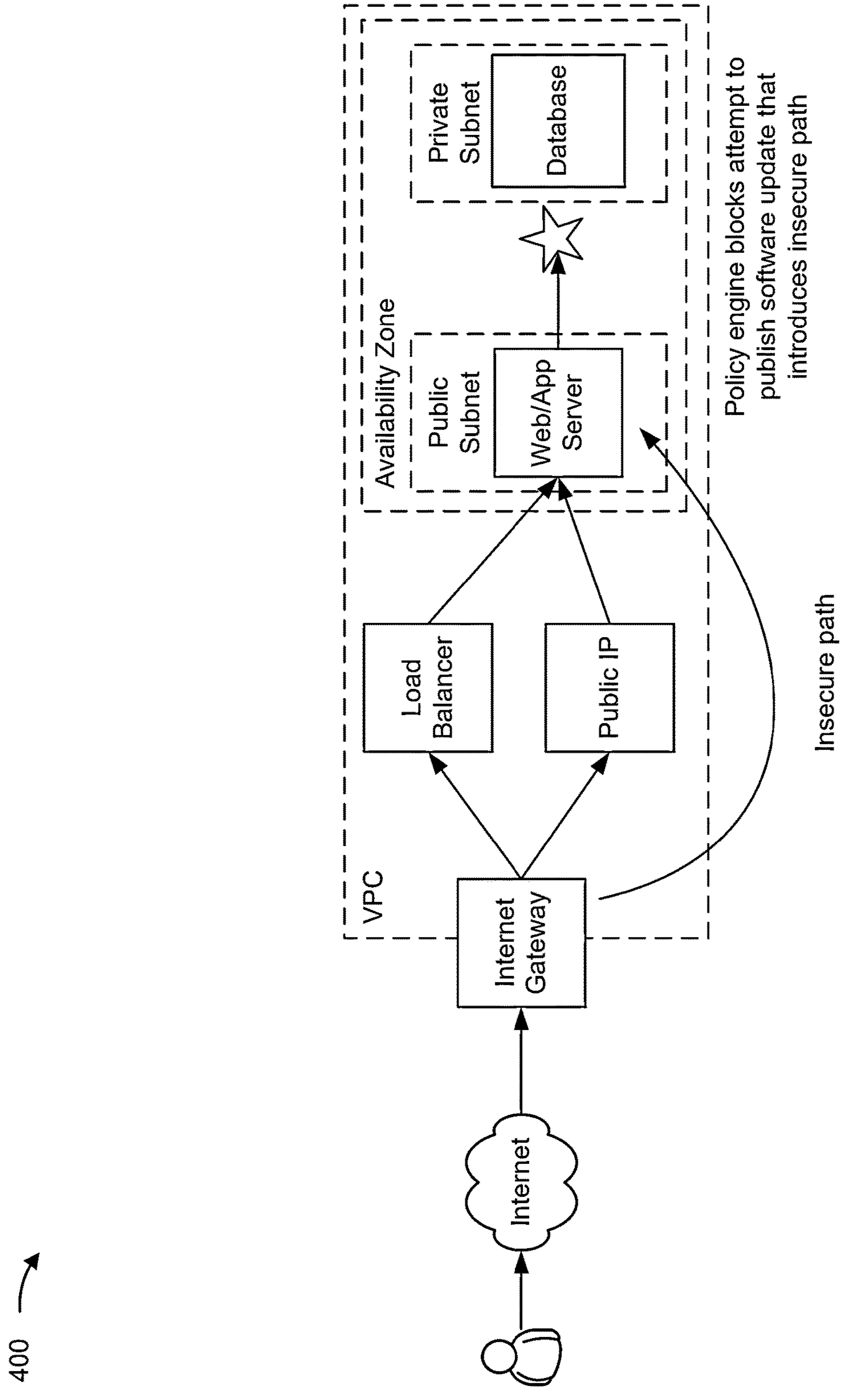

FIG. 4 is a diagram of an example implementation 400 associated with accessing resources in a computing environment based on path attestation.

As shown in FIG. 4, an application may attempt to access a database, which may be associated with a resource (e.g., a critical resource). The application may attempt to access the database after an application update. The application may access an Internet gateway via the Internet. The Internet gateway may be associated with a VPC. A first path may connect the Internet gateway and a web/application server via a load balancer. A second path may connect the Internet gateway and the web/application server via a public IP address. The web/application server may be associated with a computing instance. The web/application server may be associated with a public subnet, where the public subnet may be associated with an availability zone. A third path may connect the web/application server and the database. The database may be associated with a private subnet, where the private subnet may be associated with the availability zone. The first path and the second path may be pre-validated network paths to access the database. For example, version 1.1 of the application may already be approved to access the database via the first path or via the second path, and via the third path. However, version 1.2 of the application may attempt to access the database via a fourth path, which may bypass the load balancer and the public IP address. The fourth path may be an insecure path, which has not been previously validated for version 1.2 of the application. In this case, a policy engine may prevent the application from accessing the database. The policy engine may block an attempt to publish the software update that introduces the insecure path, where the policy engine may be associated with security operations and the attempt to publish the software update may be associated with development operations. Access to the database may be automatically blocked when a change is pushed that does not pass attestation rules, which may be enforced by the policy engine. A score associated with threat posture may be negatively affected based on the insecure path being associated with the application, and such a change to the score may cause the application to be denied access to the database.

In some implementations, a computing device may attempt to access the database, and the computing device may be within the availability zone. When the computing device attempts to access the database in a manner that has not been previously preapproved, the computing device may be denied access to the database. Alternatively, when the computing device is not a device that has been preapproved to access the database, the computing device may be denied access to the database.

As indicated above, FIG. 4 is provided as an example. Other examples may differ from what is described with regard to FIG. 4.

In some implementations, in an example use model, security operations may deploy a path attestation solution and identify/classify HVAs in collaboration with business owners and other stakeholders. Owners and research and development (R&D) owners, being responsible for losses incurred from a breach, may be made aware of an ability to identify threat exposure inexpensively and continuously. Security operations may commit to operating the path attestation solution and informing necessary stakeholders of the state of their applications on a regular basis. Enforcement and compliance may be mandated, and risk appetite may be determined on a case-by-case basis. An owner may be informed, via an action-oriented scorecard, of their threat posture. A quantitative risk appetite baseline may be established based on the score. The risk appetite may consider the exposure, as well as the level of unknown, along path(s) to the HVAs. The owner of the HVA may also impose policies based on preexisting state or desired state path-based criteria. Each time application components are updated or deployed, an opportunity to review the threat posture may be provided (e.g., better, worse, or same threat posture), which may allow new exposure paths to be caught before exploited. When necessary, a validation of the threat posture may be performed, which may prevent a breach with a degree of confidence aligned with certain objectives.

Figure 5:
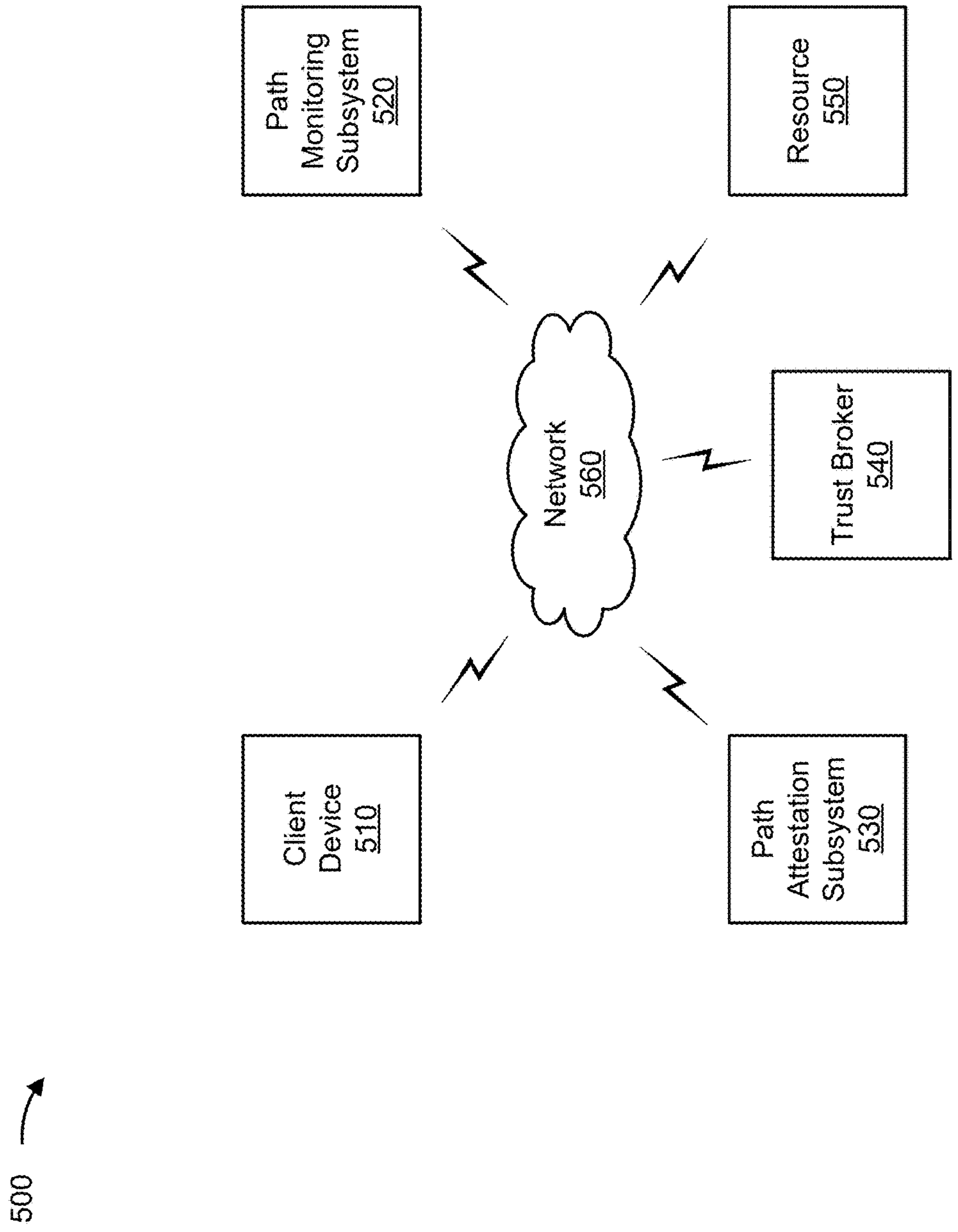
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include a client device 510 that executes an application, a path monitoring subsystem 520, a path attestation subsystem 530, a trust broker 540, a resource 550 (e.g., a critical resource) in a computing environment, and a network 560. Devices of environment 500 may interconnect via wired connections, wireless connections, or a combination of wired and wireless connections.

The client device 510 may include one or more devices capable of receiving, generating, storing, processing, and/or providing information associated with accessing resources in a computing environment based on path attestation, as described elsewhere herein. The client device 510 may include a communication device and/or a computing device. For example, the client device 510 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The path monitoring subsystem 520 may include one or more devices capable of receiving, generating, storing, processing, providing, and/or routing information associated with accessing resources in a computing environment based on path attestation, as described elsewhere herein. The path monitoring subsystem 520 may include a communication device and/or a computing device. For example, the path monitoring subsystem 520 may include a server, such as an application server, a client server, a web server, a database server, a host server, a proxy server, a virtual server (e.g., executing on computing hardware), or a server in a cloud computing system. In some implementations, the path monitoring subsystem 520 may include computing hardware used in a cloud computing environment.

The path attestation subsystem 530 may include one or more devices capable of receiving, generating, storing, processing, providing, and/or routing information associated with accessing resources in a computing environment based on path attestation, as described elsewhere herein. The path attestation subsystem 530 may include a communication device and/or a computing device. For example, the path attestation subsystem 530 may include a server, such as an application server, a client server, a web server, a database server, a host server, a proxy server, a virtual server (e.g., executing on computing hardware), or a server in a cloud computing system. In some implementations, the path attestation subsystem 530 may include computing hardware used in a cloud computing environment.

The trust broker 540 may include one or more devices capable of receiving, generating, storing, processing, providing, and/or routing information associated with accessing resources in a computing environment based on path attestation, as described elsewhere herein. The trust broker 540 may include a communication device and/or a computing device. For example, the trust broker 540 may include a server, such as an application server, a client server, a web server, a database server, a host server, a proxy server, a virtual server (e.g., executing on computing hardware), or a server in a cloud computing system. In some implementations, the trust broker 540 may include computing hardware used in a cloud computing environment.

The resource 550 may include one or more devices capable of receiving, generating, storing, processing, and/or providing information associated with accessing resources in a computing environment based on path attestation, as described elsewhere herein. The resource 550 may include a communication device and/or a computing device. For example, the resource 550 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The resource 550 may communicate with one or more other devices of environment 500, as described elsewhere herein.

The network 560 may include one or more wired and/or wireless networks. For example, the network 560 may include a wireless wide area network (e.g., a cellular network or a public land mobile network), a LAN (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 560 enables communication among the devices of environment 500.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
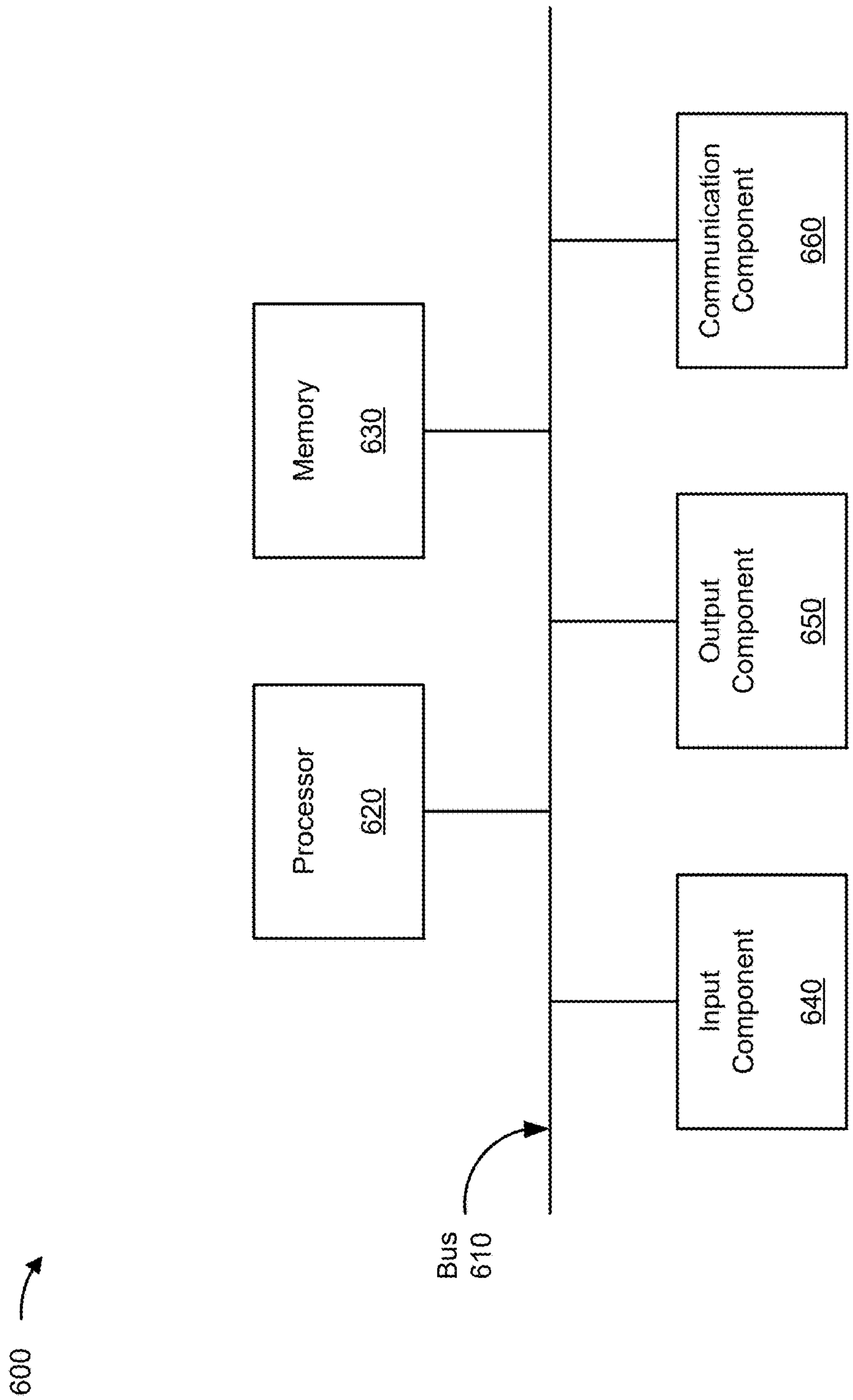
FIG. 6 is a diagram of example components of one or more devices of FIG. 5.

FIG. 6 is a diagram of example components of a device 600 associated with accessing resources in a computing environment. The device 600 may correspond to a client device (e.g., client device 510), a path monitoring subsystem (e.g., path monitoring subsystem 520), a path attestation subsystem (e.g., path attestation subsystem 530), a trust broker (e.g., trust broker 540), and/or a resource (e.g., resource 550). In some implementations, the client device, the path monitoring subsystem, the path attestation subsystem, the trust broker, and/or the resource may include one or more devices 600 and/or one or more components of the device 600. As shown in FIG. 6, the device 600 may include a bus 610, a processor 620, a memory 630, an input component 640, an output component 650, and/or a communication component 660.

The bus 610 may include one or more components that enable wired and/or wireless communication among the components of the device 600. The bus 610 may couple together two or more components of FIG. 6, such as via operative coupling, communicative coupling, electronic coupling, and/or electric coupling. For example, the bus 610 may include an electrical connection (e.g., a wire, a trace, and/or a lead) and/or a wireless bus. The processor 620 may include a central processing unit, a graphics processing unit, a microprocessor, a controller, a microcontroller, a digital signal processor, a field-programmable gate array, an application-specific integrated circuit, and/or another type of processing component. The processor 620 may be implemented in hardware, firmware, or a combination of hardware and software. In some implementations, the processor 620 may include one or more processors capable of being programmed to perform one or more operations or processes described elsewhere herein.

The memory 630 may include volatile and/or nonvolatile memory. For example, the memory 630 may include random access memory (RAM), read only memory (ROM), a hard disk drive, and/or another type of memory (e.g., a flash memory, a magnetic memory, and/or an optical memory). The memory 630 may include internal memory (e.g., RAM, ROM, or a hard disk drive) and/or removable memory (e.g., removable via a universal serial bus connection). The memory 630 may be a non-transitory computer-readable medium. The memory 630 may store information, one or more instructions, and/or software (e.g., one or more software applications) related to the operation of the device 600. In some implementations, the memory 630 may include one or more memories that are coupled (e.g., communicatively coupled) to one or more processors (e.g., processor 620), such as via the bus 610. Communicative coupling between a processor 620 and a memory 630 may enable the processor 620 to read and/or process information stored in the memory 630 and/or to store information in the memory 630.

The input component 640 may enable the device 600 to receive input, such as user input and/or sensed input. For example, the input component 640 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 650 may enable the device 600 to provide output, such as via a display, a speaker, and/or a light-emitting diode. The communication component 660 may enable the device 600 to communicate with other devices via a wired connection and/or a wireless connection. For example, the communication component 660 may include a receiver, a transmitter, a transceiver, a modem, a network interface card, and/or an antenna.

The device 600 may perform one or more operations or processes described herein. For example, a non-transitory computer-readable medium (e.g., memory 630) may store a set of instructions (e.g., one or more instructions or code) for execution by the processor 620. The processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry may be used instead of or in combination with the instructions to perform one or more operations or processes described herein. Additionally, or alternatively, the processor 620 may be configured to perform one or more operations or processes described herein. Thus, implementations described herein are not limited to any specific combination of hardware circuitry and software.

The number and arrangement of components shown in FIG. 6 are provided as an example. The device 600 may include additional components, fewer components, different components, or differently arranged components than those shown in FIG. 6. Additionally, or alternatively, a set of components (e.g., one or more components) of the device 600 may perform one or more functions described as being performed by another set of components of the device 600.

Figure 7:
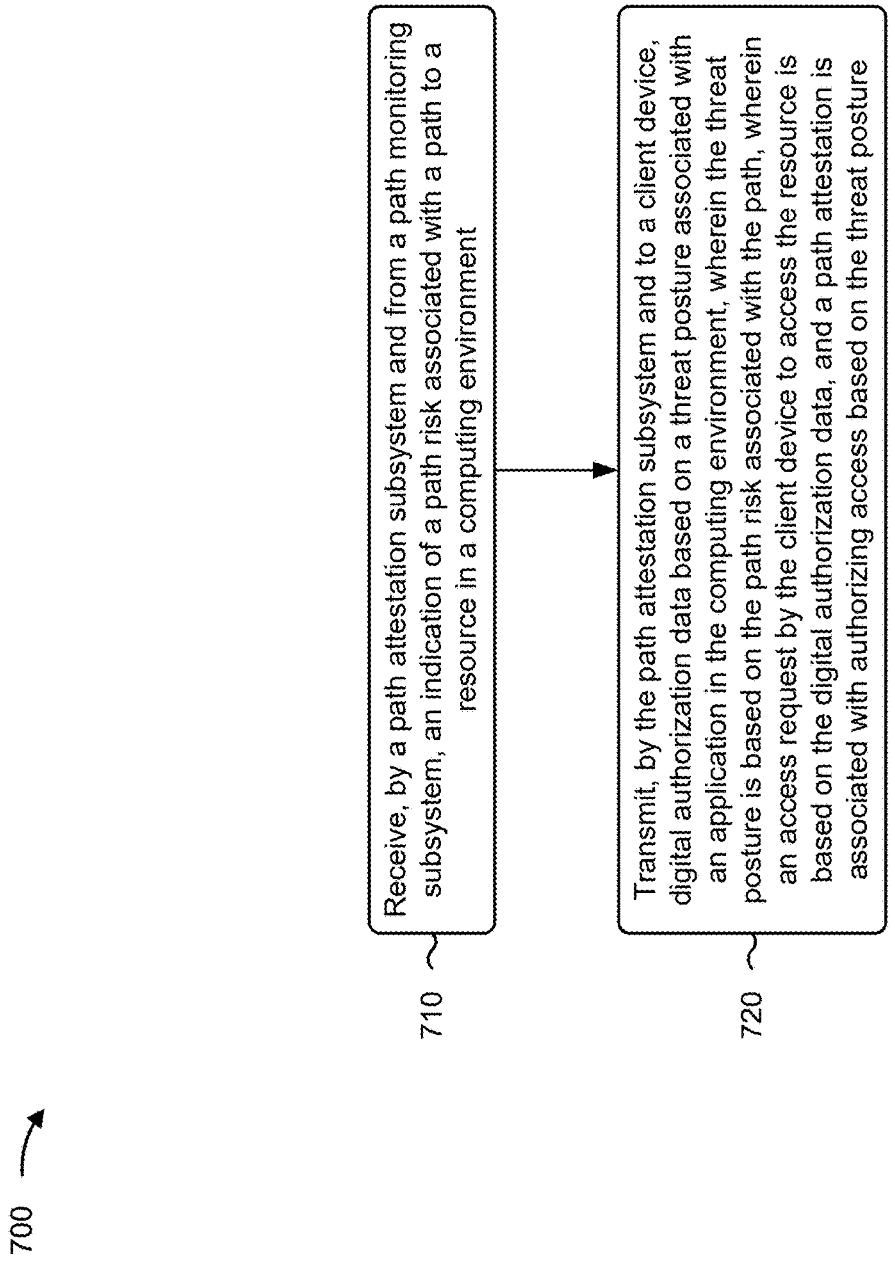
FIG. 7 is a flowchart of am example process relating to accessing resources in a computing environment based on path attestation.

FIG. 7 is a flowchart of an example process 700 associated with accessing resources in a computing environment. In some implementations, one or more process blocks of FIG. 7 are performed by a path attestation subsystem (e.g., path attestation subsystem 530). In some implementations, one or more process blocks of FIG. 7 are performed by another device or a group of devices separate from or including the path attestation subsystem, such as a client device (e.g., client device 510), a path monitoring subsystem (e.g., path monitoring subsystem 520), a trust broker (e.g., trust broker 540), and/or a resource (e.g., resource 550). Additionally, or alternatively, one or more process blocks of FIG. 7 may be performed by one or more components of device 600, such as processor 620, memory 630, input component 640, output component 650, and/or communication component 660.

As shown in FIG. 7, process 700 may include receiving, from a path monitoring subsystem, an indication of a path risk associated with a path to a resource in a computing environment (block 710). For example, the path attestation subsystem may receive an indication of a path risk associated with a path to a resource in a computing environment, as described above.

As further shown in FIG. 7, process 700 may include transmitting, to a client device, digital authorization data based on a threat posture associated with an application in the computing environment, wherein the threat posture is based on the path risk associated with the path, and an access request by the client device to access the resource is based on the digital authorization data (block 730). For example, the path attestation subsystem may transmit, to a client device, digital authorization data based on a threat posture associated with an application in the computing environment, wherein the threat posture is based on the path risk associated with the path, and an access request by the client device to access the resource is based on the digital authorization data, as described above.

Process 700 may include additional implementations, such as any single implementation or any combination of implementations described below and/or in connection with one or more other processes described elsewhere herein.

In a first implementation, the path risk is based on a request, from the client device to the path monitoring subsystem, for a path approval for the path to the resource in the computing environment, and the digital authorization data is transmitted based on the request.

In a second implementation, alone or in combination with the first implementation, the request is based on an application path, and a previous path approval is no longer valid based on the application update.

In a third implementation, alone or in combination with one or more of the first and second implementations, the access request indicates the digital authorization data or a substitute for the digital authorization data.

In a fourth implementation, alone or in combination with one or more of the first through third implementations, the resource is an asset that is protected for purposes of confidentiality, integrity, or availability.

In a fifth implementation, alone or in combination with one or more of the first through fourth implementations, process 700 includes receiving, from the client device, information associated with the threat posture, wherein the information includes one or more of: a credential score, an identity score, a trusted execution status, a device posture score, or a device intrusion score, and wherein the digital authorization data is received based on the information.

In a sixth implementation, alone or in combination with one or more of the first through fifth implementations, the digital authorization data is transmitted based on the path to the resource being a previously used path to access the resource, and a request for path approval is not associated with an unexpected exploitable path.

In a seventh implementation, alone or in combination with one or more of the first through sixth implementations, the digital authorization data is transmitted based on the threat posture satisfying a threshold.

In an eighth implementation, alone or in combination with one or more of the first through seventh implementations, the digital authorization data is transmitted based on a comparison of the threat posture to a previous deployment of the application.

In a ninth implementation, alone or in combination with one or more of the first through eighth implementations, the path is a path of potential communication and is an input, of a plurality of inputs, to a trust broker in the computing environment for determining whether to grant access to the resource, and a path attestation ensures that a change to a potential path exposure is detected and reevaluated for security risk before access to the resource is granted.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or,"

unless explicitly stated otherwise (e.g., if used in combination with "either" or "only one of").

What is claimed is:

1. A method, comprising:

receiving, by a path attestation subsystem and from a path monitoring subsystem, an indication of a path risk associated with a path of potential communication from a client device to a resource in a computing environment, wherein the path of potential communication is for determining whether to grant access to the resource; and transmitting, by the path attestation subsystem and to the client device, digital authorization data based on a threat posture associated with an application executing on the client device, wherein;

the threat posture is based on the path risk associated with the path, an access request by the client device to access the resource is based on the digital authorization data, and a path attestation is associated with authorizing access based on the threat posture and ensuring that a change to a potential path exposure is detected and reevaluated for security risk before access to the resource is granted.

2. The method of claim 1, wherein the path risk is based on a request, from the client device to the path monitoring subsystem, for a path approval for the path to the resource in the computing environment, and the digital authorization data is transmitted based on the request.

3. The method of claim 2, wherein the path is used by the application to access the resource, wherein the request is based on the path, and wherein a previous path approval for the application to use to access the resource is no longer valid based on the application update.

4. The method of claim 1, wherein the access request indicates the digital authorization data or a substitute for the digital authorization data.

5. The method of claim 1, wherein the resource is an asset that is protected for purposes of confidentiality, integrity, or availability.

6. The method of claim 1, further comprising:

receiving, by the path attestation subsystem and from the client device, information associated with the threat posture, wherein the information includes one or more of: a credential score, an identity score, a trusted execution status, a device posture score, or a device intrusion score, and wherein the digital authorization data is transmitted based on the information.

7. The method of claim 1, wherein the digital authorization data is transmitted based on the path to the resource being a previously used path by the application to access the resource, and a request for path approval is not associated with an unexpected exploitable path introduced by the application to access the resource and associated with a security vulnerability.

8. The method of claim 1, wherein the digital authorization data is transmitted based on the threat posture satisfying a threshold.

9. The method of claim 1, wherein the digital authorization data is transmitted based on a comparison of the threat posture to a previous deployment of the application.

10. The method of claim 1, wherein information representing the path is provided as an input to a trust broker device in the computing environment for determining whether to grant access to the resource.

11. A device, comprising:

one or more processors configured to:

receive, from a path monitoring subsystem, an indication of a path risk associated with a path of potential communication from a client device to a resource in a computing environment, wherein the path of potential communication is for determining whether to grant access to the resource; and transmit, to the client device, digital authorization data based on a threat posture associated with an application executing on the client device, wherein:

the threat posture is based on the path risk associated with the path, an access request by the client device to access the resource is based on the digital authorization data, and a path attestation is associated with authorizing access based on the threat posture and ensuring that a change to a potential path exposure is detected and reevaluated for security risk before access to the resource is granted.

12. The device of claim 11, wherein the path risk is based on a request, from the client device to the path monitoring subsystem, for a path approval for the path to the resource in the computing environment, and the digital authorization data is transmitted based on the request.

13. The device of claim 11, wherein the resource is an asset that is protected for purposes of confidentiality, integrity, or availability.

14. The device of claim 11, wherein the one or more processors are further configured to:

receive, from the client device, information associated with the threat posture, wherein the information includes one or more of: a credential score, an identity score, a trusted execution status, a device posture score, or a device intrusion score, and wherein the digital authorization data is transmitted based on the information.

15. The device of claim 11, wherein:

the digital authorization data is transmitted based on the path to the resource being a previously used path by the application to access the resource, and a request for path approval is not associated with an unexpected exploitable path introduced by the application to access the resource and associated with a security vulnerability;

the digital authorization data is transmitted based on the threat posture satisfying a threshold; or the digital authorization data is transmitted based on a comparison of the threat posture to a previous deployment of the application.

16. The device of claim 11, wherein information representing the path is provided as an input, to a trust broker device in the computing environment for determining whether to grant access to the resource.

17. A non-transitory computer-readable medium storing a set of instructions, the set of instructions comprising:

one or more instructions that, when executed by one or more processors of a device, cause the device to:

receive, from a path monitoring subsystem, an indication of a path risk associated with a path of potential communication from a client device to a resource in a computing environment, wherein the path of potential communication is for determining whether to grant access to the resource; and transmit, to a client device, digital authorization data based on a threat posture associated with an application executing on the client device, wherein;

the threat posture is based on the path risk associated with the path, an access request by the client device to access the resource is based on the digital authorization data, and a path attestation is associated with authorizing access based on the threat posture and ensuring that a change to a potential path exposure is detected and reevaluated for security risk before access to the resource is granted.

18. The non-transitory computer-readable medium of claim 17, wherein the path risk is based on a request, from the client device to the path monitoring subsystem, for a path approval for the path to the resource in the computing environment, and the digital authorization data is transmitted based on the request.

19. The non-transitory computer-readable medium of claim 17, wherein the one or more instructions, when executed by the one or more processors, further cause the device to:

receive information associated with the threat posture, wherein the information includes one or more of: a credential score, an identity score, a trusted execution status, a device posture score, or a device intrusion score, and wherein the digital authorization data is received based on the information.

20. The non-transitory computer-readable medium of claim 17, wherein:

the digital authorization data is transmitted based on the path to the resource being a previously used path by the application to access the resource, and a request for path approval is not associated with an unexpected exploitable path introduced by the application to access the resource and associated with a security vulnerability;

the digital authorization data is transmitted based on the threat posture satisfying a threshold; or the digital authorization data is transmitted based on a comparison of the threat posture to a previous deployment of the application.

* * * * *